(12) United States Patent
Kawamura et al.

(10) Patent No.: US 11,219,199 B2
(45) Date of Patent: Jan. 11, 2022

(54) FISHING ROD

(71) Applicant: GLOBERIDE, INC., Tokyo (JP)

(72) Inventors: Takuji Kawamura, Tokyo (JP);
Hirokazu Yamamoto, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 342 days.

(21) Appl. No.: 16/327,565

(22) PCT Filed: Jun. 29, 2017

(86) PCT No.: PCT/JP2017/023893
§ 371 (c)(1),
(2) Date: Feb. 22, 2019

(87) PCT Pub. No.: WO2018/042856
PCT Pub. Date: Mar. 8, 2018

(65) Prior Publication Data
US 2019/0223419 A1    Jul. 25, 2019

(30) Foreign Application Priority Data

Aug. 31, 2016   (JP) .............................. JP2016-168883

(51) Int. Cl.
*A01K 87/02*   (2006.01)
*A01K 87/04*   (2006.01)
*A01K 87/00*   (2006.01)

(52) U.S. Cl.
CPC .............. *A01K 87/02* (2013.01); *A01K 87/00* (2013.01); *A01K 87/04* (2013.01)

(58) Field of Classification Search
CPC ......... A01K 87/04; A01K 87/02; A01K 87/00
(Continued)

(56) References Cited

U.S. PATENT DOCUMENTS 3,171,229 A * 3/1965 Shobert ................. A01K 87/04
 43/24
3,974,012 A * 8/1976 Hogarth ................. A63B 53/10
 156/161

(Continued)

FOREIGN PATENT DOCUMENTS

EP   0826481 A2   3/1998
JP   02-026474 U1   2/1990
(Continued)

OTHER PUBLICATIONS

S. Ahmari et al., Curing Temperature, 2015, Science Direct, (Informational Reference) (Year: 2014).*

(Continued)

*Primary Examiner* — Darren W Ark
*Assistant Examiner* — Katelyn T Truong
(74) *Attorney, Agent, or Firm* — K&L Gates LLP

(57) ABSTRACT

One object is to provide a fishing rod in which stability in securing a fitting is achieved. The fishing rod includes a molded rod section having a surface and the fitting placed on the surface, the fitting having a securing portion and being secured to the surface with a sheet member made of a thermosetting resin that is wound on the securing portion and heat-cured. The sheet member includes a first sheet member and a second sheet member made of thermosetting resins, the first sheet member being placed or wound on the rod section, the second sheet member being wound over the first sheet member and the securing portion placed on the first sheet member. The thermosetting resins of the first sheet member and the second sheet member have different curing temperatures from each other.

6 Claims, 5 Drawing Sheets

(58) Field of Classification Search
USPC .......... 47/4, 18.5, 18.1 R; 43/4, 18.5, 18.1 R
See application file for complete search history.

(56) References Cited

U.S. PATENT DOCUMENTS

| | | | | |
|---|---|---|---|---|
| 4,057,926 | A | * 11/1977 | Cordell, Jr. ............ | A01K 87/00 43/18.5 |
| 4,885,865 | A | * 12/1989 | Rumbaugh ............ | A01K 87/00 43/18.5 |
| 10,321,669 | B2 | * 6/2019 | Akiba .................... | A01K 87/06 |
| 2009/0077857 | A1 | * 3/2009 | Lee ........................ | A01K 87/00 43/17 |
| 2015/0296761 | A1 | * 10/2015 | Sugaya ................. | A01K 99/00 43/24 |

FOREIGN PATENT DOCUMENTS

| | | | |
|---|---|---|---|
| JP | 03-129062 U1 | 12/1991 | |
| JP | 06-14678 A | 1/1994 | |
| JP | 10-271935 A | 10/1998 | |
| JP | H11-046631 A | 2/1999 | |
| JP | 2000083517 A | * 3/2000 | |
| JP | 2005-151929 A | 6/2005 | |

OTHER PUBLICATIONS

Smooth-On.com, "Heat Curing" and "Post Curing", website access 2021 (Informational Reference) https://www.smooth-on.com/support/faq/63/ (Year: 2021).*
International Search Report PCT/JP2017/023893 dated Oct. 3, 2017 with English translation.
International Preliminary Report on Patentability and Written Opinion of the International Searching Authority dated Mar. 5, 2019 issued in corresponding International Patent Application No. PCT/JP2017/023893 with English translation.
The Extended European Search Report dated Mar. 17, 2020, of counterpart European Application No. 17845866.7.

* cited by examiner

FISHING ROD

CROSS-REFERENCE TO RELATED APPLICATIONS

This application is the U.S. National Phase of PCT/JP2017/023893, filed Jun. 29, 2017, which claims the benefit of priority from Japanese Patent Application Serial No. 2016-168883 filed Aug. 31, 2016, the contents of each of which are hereby incorporated by reference in their entirety. The present invention relates to a fishing rod and more specifically to a fishing rod characterized by a securing structure for securing a fitting such as a fishing line guide or a reel seat to a rod section.

BACKGROUND

Technical Field

Conventionally, there is known a fishing rod used with a reel mounted thereon, in which a component (hereinafter, referred to also as a fitting) such as a fishing line guide or a reel seat is secured on a surface of a rod section. In order to secure such a fitting, a securing thread is wound on the fitting in a state of being placed on the rod section and a synthetic resin is applied on a surface thereof. Furthermore, in addition to this securing method, for example, Patent Literature 1 discloses that a prepreg sheet formed of reinforcement fibers impregnated with a synthetic resin is wound on a securing portion of a fitting and then is heated so as to cure the synthetic resin, thus securing the fitting.

Patent Literature 1 discloses a securing method in which, in securing a leg portion of a fishing line guide, a gap filling member (which may be formed of the prepreg sheet) made of a synthetic resin is disposed between the leg portion and a surface of a rod section, and the prepreg sheet is further wound over the leg portion and then is heat-treated in this state, thus preventing meandering of the reinforcement fibers and formation of a depression on the surface.

RELEVANT REFERENCES

List of Relevant Patent Literature

Patent Literature 1: Japanese Utility Model Application Publication No. Hei 2-26474

SUMMARY

In the above-described securing method disclosed in Patent Literature 1, as the synthetic resin used to form the gap filling member and the prepreg sheet, a thermosetting resin is used in consideration of a fact that it is soft in an uncured state and thus is easily processed (wound). Typically, a thermosetting resin in an uncured state is characterized in that a chemical reaction thereof is facilitated by heating, and when heated to a given temperature (a curing temperature), the thermosetting resin loses flowability and thus is cured (the heating causes a viscosity of the thermosetting resin to be decreased once, and after the thermosetting resin is brought into a liquid state, the viscosity is increased to cure the thermosetting resin). Therefore, when the fitting is placed on the gap filling member made of a thermosetting resin, the gap filling member being disposed on the surface of the rod section, and the prepreg sheet is further stacked over the fitting and then is heat-treated in this state, variations occur in the thermosetting resin due to a flow of the thermosetting resin before reaching the curing temperature. At this time, similar resin variations are occurring in regions above and below the fitting, so that in a state where the resin has reached the curing temperature and thus is cured, a secured state (a securing position) of the fitting might be unstable. Furthermore, there may be a case where the resin of the gap filling member present in the region below the fitting leaks from an edge portion of the prepreg sheet wound over the fitting and is cured in this state.

As thus described, during a heat treatment step, similar resin variations occur above and below a fitting, so that a secured state of the fitting becomes unstable, causing a problem of poor durability. That is, as described above, when a viscosity of a thermosetting resin is decreased at once, the thermosetting resin is likely to flow, and stability thereof is lowered. Particularly in the method for securing a fitting on a rod section by use of a sheet member made of a synthetic resin, a securing process (the sheet member made of a synthetic resin is wound on the fitting and then is heat-treated) is performed after a coat or the like is applied on a surface of the rod section. This might cause a leakage resin to flow in the coat, resulting also in deterioration of an outer appearance of a fishing rod.

The present invention addresses the above-described problems, and one object thereof is to provide a fishing rod including a rod section, a fitting being secured on a surface of the rod section by use of a sheet member made of a thermosetting resin, in which stability in securing the fitting is achieved.

In order to achieve the above-described object, the present invention provides a fishing rod including a molded rod section having a surface, and a fitting placed on the surface of the molded rod section, the fitting having a securing portion, the fitting being secured to the surface with a sheet member made of a thermosetting resin that is wound on the securing portion of the fitting and heat-cured. The sheet member includes a first sheet member made of a thermosetting resin and a second sheet member made of a thermosetting resin, the first sheet member being placed or wound on the rod section, the second sheet member being wound over the first sheet member and the securing portion of the fitting placed on the first sheet member. The thermosetting resin of the first sheet member and the thermosetting resin of the second sheet member have different curing temperatures from each other.

As described above, with respect to the securing portion for securing the fitting on the rod section, the thermosetting resin in a region on an upper side thereof and the thermosetting resin in a region on a lower side thereof have different curing temperatures from each other. This suppresses a phenomenon in which the resins above and below the securing portion flow in a similar state during a heat treatment. That is, when heating is performed, the sheet member having a lower curing temperature is cured first, after which the sheet member having a higher curing temperature is cured, and thus a behavior of the securing portion is stabilized during the heating, so that a secured state (a securing position) of a component to be secured can be stabilized.

In the above-mentioned configuration, it is particularly preferable that the thermosetting resin of the second sheet member has a curing temperature lower than that of the thermosetting resin of the first sheet member. According to this configuration, the resin on an outer side of the securing portion is first brought to a cured state, and the resin on an inner side thereof is brought to a flowing state. This allows the resin to efficiently enter a gap portion between the rod section and the securing portion and also prevents the resin on the inner side from leaking to the exterior, thus preventing deterioration of an outer appearance.

Furthermore, in the above-described configuration, it is possible that the first sheet member is wound on the rod section in one or more plies, the securing portion of the fitting being interposed between overlapping portions of the first sheet member wound on the rod section, and the first sheet member and the second sheet member are prepreg sheets formed of reinforcement fibers impregnated with the thermosetting resins. In a case where the first sheet member and the second sheet member are the prepreg sheets, it is preferable that the first sheet member is formed of plain-woven reinforcement fibers, and the second sheet member is formed of reinforcement fibers arranged regularly in an oblique direction.

ADVANTAGES

According to the present invention, there is provided a fishing rod including a rod section, a fitting being secured on a surface of the rod section by use of a sheet member made of a thermosetting resin, in which stability in securing the fitting is achieved.

DESCRIPTION OF THE PREFERRED EMBODIMENTS

Figure 1:
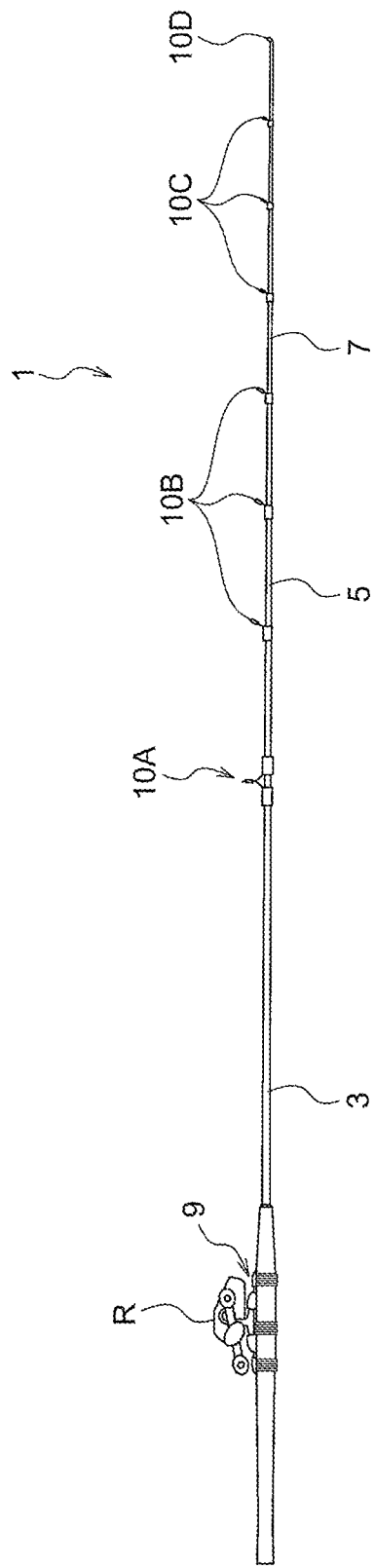
FIG. 1 is a view showing one embodiment of a fishing rod according to the present invention.

An embodiment of a fishing rod according to the present invention will now be specifically described with reference to the appended drawings. FIG. 1 is a view showing one embodiment of the fishing rod according to the present invention. A fishing rod 1 of this embodiment includes a butt-side rod section 3, an intermediate rod section 5, and a tip rod section 7 (each referred to also as a rod section), and these rod sections are ordinarily jointed to each other. Furthermore, in the fishing rod 1 of this embodiment, the butt-side rod section 3 is provided with a reel seat 9, and a fishing line guide for guiding a fishing line is attached at each appropriate location on the butt-side rod section 3, the intermediate rod section 5, and the tip rod section 7, the fishing line being released from a reel R mounted to the reel seat 9. In FIG. 1, a fishing line guide provided on the butt-side rod section 3 is denoted as 10A, a fishing line guide provided on the intermediate rod section 5 is denoted as 10B, and a fishing line guide provided on the tip rod section 7 is denoted as 10C. Furthermore, a top guide 10D is attached to a distal end of the tip rod section 7. In this case, the fishing line guides 10A to 10C and the reel seat 9 each constitute a fitting secured on a surface (an outer peripheral surface) of the rod sections.

Preferably, the butt-side rod section 3, the intermediate rod section 5, and the tip rod section 7 are formed of a tubular body made of a fiber-reinforced resin and each formed in a tubular shape having predetermined dimensions in accordance with a conventional method. As the conventional method, for example, a fiber-reinforced resin prepreg (a prepreg sheet) is wound on a core bar and subjected to a heating step, after which the core bar is pulled out. The fiber-reinforced resin prepreg used in this case is formed by impregnating reinforcement fibers (mainly, carbon fibers, glass fibers, or the like) with a thermosetting synthetic resin such as an epoxy resin. These rod sections can be molded in various forms. For example, they can be formed in a solid structure or by jointing a tubular body to a solid core material (for example, a superelastic alloy wire rod or a superelastic resin material).

Figure 2:
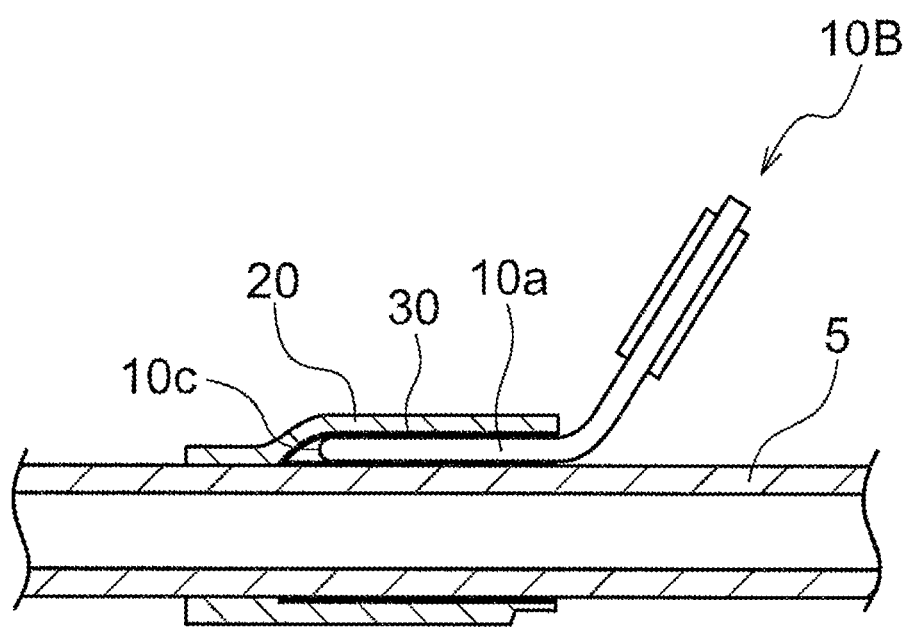
FIG. 2 is a schematic sectional view showing a secured state of a leg portion of a fishing line guide of the fishing rod shown in FIG. 1.
Figure 3:
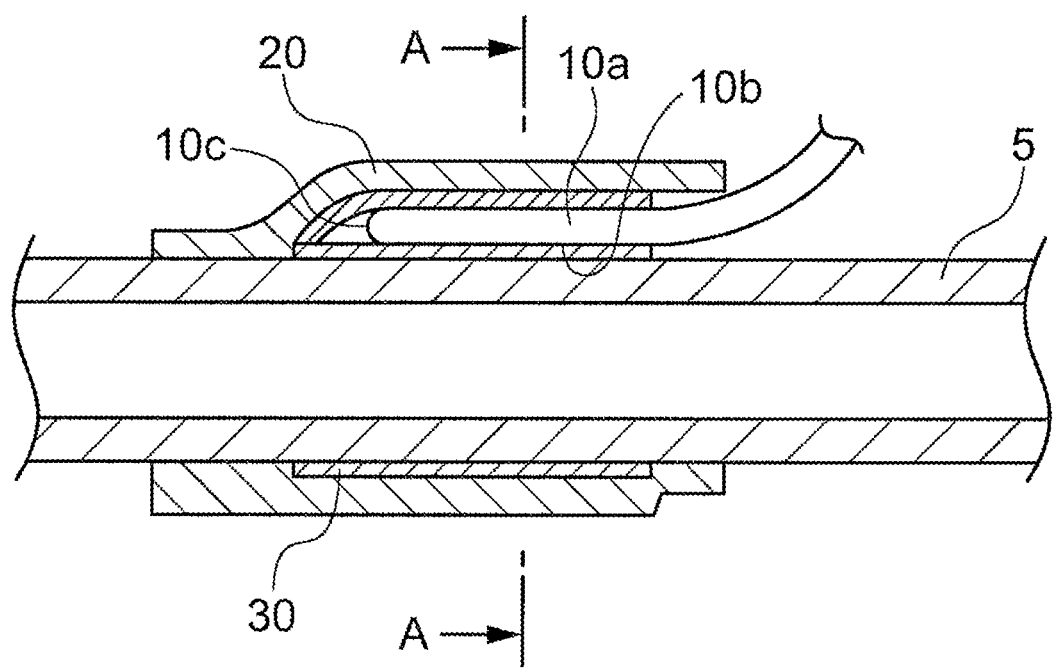
FIG. 3 is a sectional view showing a detailed configuration of a securing region shown in FIG. 2.
Figure 4:
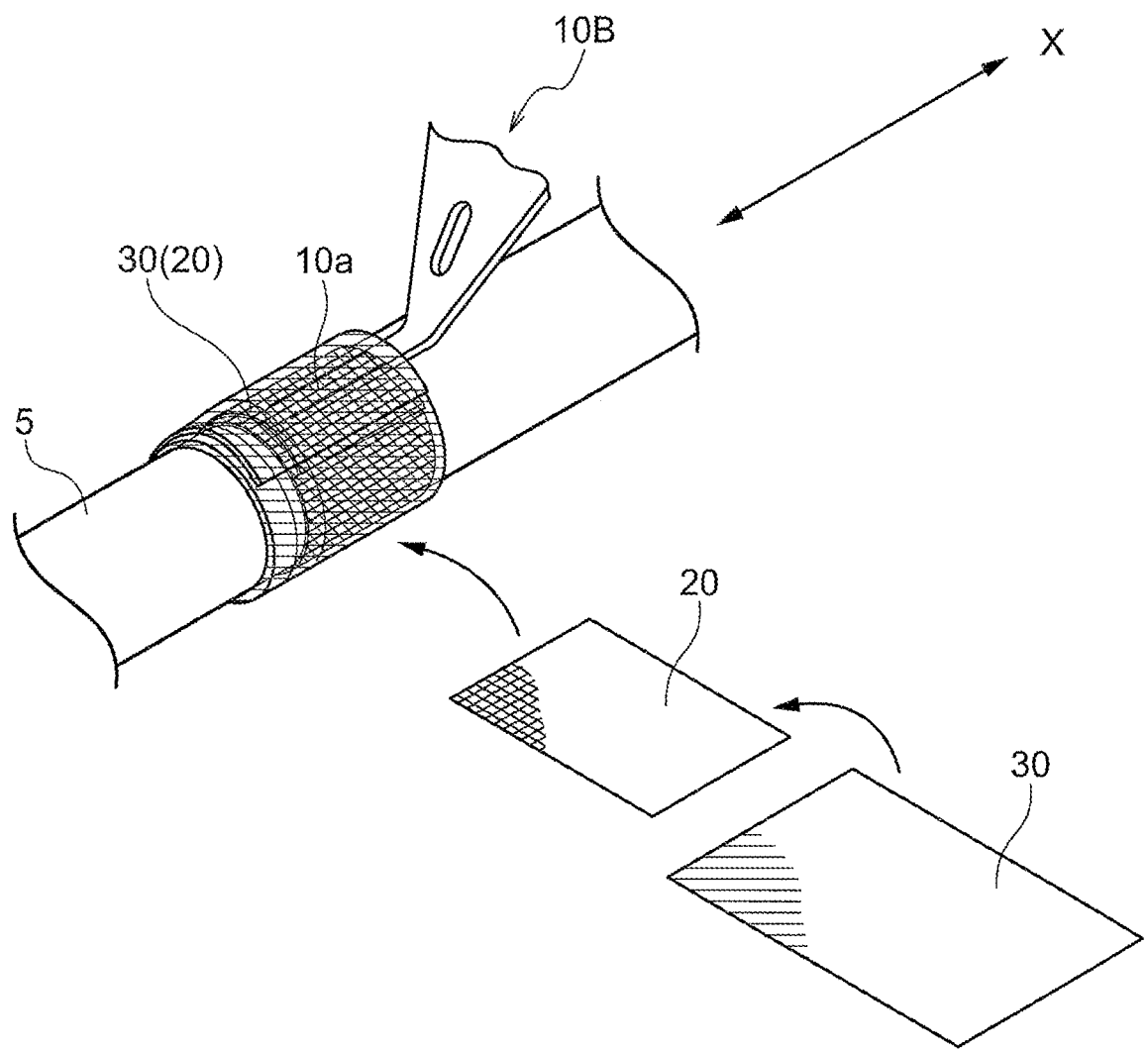
FIG. 4 is a schematic perspective view showing a configuration of prepreg sheets used to secure a securing portion of the fishing line guide to a rod section.
Figure 5:
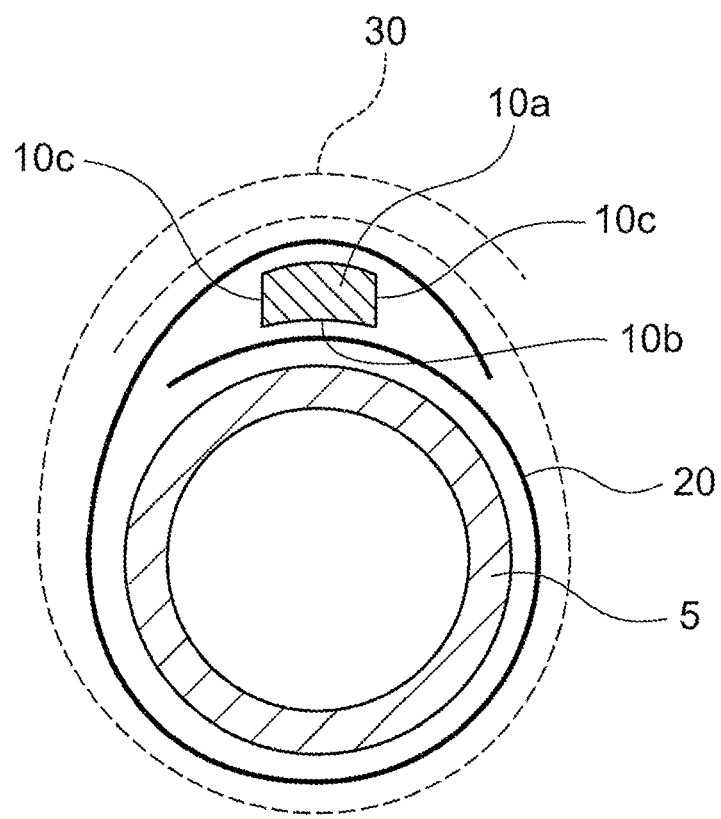
FIG. 5 is a sectional view along a line A-A in FIG. 3.

Outer surfaces of the rod sections configured as above have been surface-treated by coating or the like, and the above-described fitting is mounted to the rod sections in this surface-treated state. By using the fishing line guide 10B as an example, the following describes a method for securing the fitting and a securing structure thereof according to this embodiment. FIG. 2 to FIG. 5 are views for explaining a method for securing the fishing line guide 10B. To be more specific, FIG. 2 is a schematic sectional view showing a secured state of a securing portion (a leg portion) 10a of the fishing line guide 10B of the fishing rod shown in FIG. 1, FIG. 3 is a sectional view showing a detailed configuration of a securing region shown in FIG. 2, FIG. 4 is a schematic perspective view showing a configuration of prepreg sheets used to secure the securing portion of the fishing line guide to the rod section, and FIG. 5 is a sectional view along a line A-A in FIG. 3.

As shown in FIG. 2, the securing portion 10a of the fishing line guide 10B, which is the fitting, is placed on a surface of the rod section (the intermediate rod section) 5 molded. Then, a sheet member (a second sheet member) 30 made of a thermosetting resin is wound on a part of the rod section 5 where the securing portion 10a is placed and heated to secure the fishing line guide 10B. The securing portion 10a has a width smaller than a diameter of the rod section 5 and extends in an axial direction. A lower surface 10b of the securing portion 10a is a flat surface or a curved surface having a curvature different from that of the rod section. Because of this, a gap is generated between the lower surface 10b and the surface of the rod section.

In this embodiment, in securing the securing portion 10a in the above-described manner, as shown in FIG. 4 and FIG. 5, a sheet member (a first sheet member) 20 made of a thermosetting resin is first wound on the rod section 5, and the securing portion 10a is placed so as to be interposed between overlapping portions of the first sheet member 20 thus wound. Then, the second sheet member 30 is further wound over the wound first sheet member 20 and secured by use of a fastening tape (not shown). A winding thus obtained in this state is put in a heating furnace and heat-treated.

The first sheet member 20 and the second sheet member 30 are both configured as prepreg sheets formed of reinforcement fibers impregnated with thermosetting resins as matrices, and the thermosetting resins forming the prepreg sheets have different curing temperatures from each other. Specifically, in this embodiment, the thermosetting resin of the second sheet member 30 has a curing temperature lower than that of the thermosetting resin of the first sheet member 20. For example, the second sheet member 30 uses, as its matrix resin, an epoxy resin of an 80° C. curing type, and the first sheet member 10 uses, as its matrix resin, an epoxy resin of a 120° C. curing type.

Here, the first sheet member 20 and the second sheet member 30 can also be configured as resin sheets made simply of a thermosetting resin as a base material. However, when consideration is given to securing strength, resin flow stability, an improvement in durability, and an improvement in workability (a resin sheet is likely to be deformed or damaged in the course of work), it is preferable that a prepreg sheet is used as a material used to secure the fitting. Furthermore, while it is possible that such a prepreg sheet is used only for either one of the first sheet member 20 and the second sheet member 30, the prepreg sheet is preferably used for both of the first sheet member 20 and the second sheet member 30.

While there is no particular limitation on a direction of orientation of the reinforcement fibers disposed in the first and second sheet members 20 and 30, the first sheet member 20 is preferably formed of plain-woven reinforcement fibers (for example, reinforcement fibers oriented at 0° and 90° with respect to an axial direction X (see FIG. 4)) so as to facilitate winding and make it unlikely that the fibers are displaced). Furthermore, in consideration of strength, flaw resistance, and so on, the second sheet member 30 is preferably formed of reinforcement fibers arranged regularly in an oblique direction (for example, reinforcement fibers arranged regularly so as to be inclined at 45° with respect to the axial direction X (see FIG. 4) or plain-woven reinforcement fibers inclined at a predetermined angle (for example, 45°) so as to further facilitate winding).

There is no limitation on the number of plies of the above-described first sheet member 20 wound, and the first sheet member 20 may be used by being cut into one ply or less and placed on the rod section 5 or cut into one or more plies and wound on the rod section. In this case, winding the first sheet member 20 on the rod section in two or more plies leads to a weight increase and makes it not easy to wind the first sheet member 20. Because of this, it is preferable that, as shown in FIG. 5, the number of plies of the first sheet member 20 wound is set to two or less, and the securing portion 10a of the fishing line guide 10B is interposed between overlapping portions of the first sheet member 20 after being wound in one ply. That is, with the securing portion interposed between the overlapping portions, the fishing line guide 10B can be stably brought to a secured state, and thus workability can be improved.

Further, the second sheet member 30 is further wound on the securing portion 10a secured by use of the first sheet member 20. Preferably, the second sheet member 30 is wound so as to entirely cover the first sheet member 20 that has already been wound (or placed). That is, with the first sheet member 20 entirely covered, since the second sheet member 30 is cured first during a heat treatment, the resin of the first sheet member 20 is prevented from leaking from a peripheral end region of the second sheet member 30. While there is no particular limitation on the number of plies of the second sheet member 30 wound, in consideration of a weight increase and winding ease, the number of plies is preferably set to two or less and may also be set to one or less.

As described above, the fishing rod with the securing portion 10a secured thereon is put in the heating furnace and heat-treated. At this time, as a temperature in the heating furnace increases, the first sheet member 20 and the second sheet member 30 reach predetermined curing temperatures, and thus the thermosetting resins thereof are cured. In this case, since the second sheet member 30 on an upper side has a lower curing temperature, a phenomenon is suppressed in which the thermosetting resins above and below the securing portion 10a flow in a similar state during a heat treatment. That is, when heating is performed, the second sheet member 30 on an outer side having a lower curing temperature is cured first, after which the sheet member 20 on an inner side having a higher curing temperature is cured, and thus a behavior of the securing portion 10a is stabilized, so that a secured state (a securing position) of the fishing line guide 10B is stabilized.

Particularly in this embodiment, the thermosetting resin of the second sheet member 30 has a curing temperature lower than that of the thermosetting resin of the first sheet member 20, and thus in a state where the thermosetting resin on the outer side of the securing portion 10a is cured first, the thermosetting resin on the inner side thereof is in a flowable state, and thus the resin in the flowable state can efficiently enter a gap portion between the rod section and the securing portion (such as a gap generated at the lower surface 10b of the securing portion 10a or a gap generated due to a step height of a side surface 10c of the securing portion 10a), so that a secured state can be stabilized. Furthermore, since the resin on the outer side has been cured, by the second sheet member 30 in a cured state (a secured state), it is also possible to prevent the resin on the inner side from leaking to the exterior, thus preventing deterioration of an outer appearance.

In the above-described configuration, as the thermosetting resins used as base materials of the sheet members, in addition to an epoxy resin, a phenol resin, an unsaturated polyester resin, a vinyl ester resin, an urea resin, a melamine resin, a silicon resin, a polyurethane resin, or the like can be used. That is, the sheet members disposed in upper and lower directions of the securing portion could use thermosetting resins having different curing temperatures from each other. Furthermore, the sheet member 20 on the inner side can also use a thermoplastic resin (a nylon resin, a polyethylene resin, a polypropylene resin, a phenol resin, or the like) having a melting point higher than a curing temperature of the thermosetting resin of the sheet member 30 on the outer side.

While the foregoing has described the embodiment of the present invention, the present invention is not limited thereto and is susceptible to various modifications.

While the fishing rod 1 shown in FIG. 1 is configured to be an ordinarily jointed type, a joint structure of the rod sections may be a telescopic type, an inversely jointed type, or a socket-and-spigot jointed type. Furthermore, there may be a plurality of (two or more) intermediate rod sections or no intermediate rod sections. Furthermore, the fishing rod 1 may be formed of a single rod as a whole. Furthermore, the fitting is not limited to a fishing line guide, and the above-described securing method can be applied also to a case of securing the reel seat 9 shown in FIG. 1.

LIST OF REFERENCE NUMBERS

1 fishing rod
3 butt-side rod section
5 intermediate rod section
7 tip rod section
9 reel seat (fitting)
10A, 10B, 10C fishing line guide (fitting)
20 first sheet member (prepreg sheet)
30 second sheet member (prepreg sheet)

What is claimed is:
1. A fishing rod, comprising:
a molded rod section having a surface, and a fitting placed on the surface of the molded rod section, the fitting having a securing portion, the fitting being secured to the surface with a sheet member made of a thermosetting resin that is wound on the securing portion of the fitting and heat-cured, wherein the sheet member includes a first sheet member made of a thermosetting resin and a second sheet member made of a thermosetting resin, the first sheet member being placed or wound on the molded rod section, the second sheet member being wound over the first sheet member, and the securing portion of the fitting placed on the first sheet member, wherein an optimal curing temperature of the thermosetting resin of the first sheet member and an optimal curing temperature of the thermosetting resin of the second sheet member are different from each other, and wherein the first sheet member is wound on the molded rod section in one or more plies, and the securing portion of the fitting is interposed between overlapping portions of the first sheet member wound on the molded rod section.

2. The fishing rod according to claim 1, wherein the optimal curing temperature of the thermosetting resin of the second sheet member is lower than the optimal curing temperature of the thermosetting resin of the first sheet member.

3. The fishing rod according to claim 1, wherein the first sheet member is wound on the rod section in two or less plies.

4. The fishing rod according to claim 1, wherein the second sheet member is wound so as to entirely cover the first sheet member.

5. The fishing rod according to claim 1, wherein the first sheet member and the second sheet member each are a prepreg sheet formed of reinforcement fibers impregnated with the thermosetting resins of the first sheet and the second sheet respectively.

6. The fishing rod according to claim 5, wherein the reinforcement fibers of the first sheet member are plain-woven reinforcement fibers, and the reinforcement fibers of the second sheet member are reinforcement fibers arranged regularly in an oblique direction with respect to an axial direction of the molded rod section.

* * * * *